United States Patent Office 3,112,332
Patented Nov. 26, 1963

3,112,332
CYANOALKYLSILANEDIOLS
Roscoe A. Pike, Grand Island, N.Y., assignor to Union Carbide Corporation, a corporation of New York
No Drawing. Filed June 25, 1958, Ser. No. 744,349
6 Claims. (Cl. 260—448.2)

The present invention relates to cyanoalkylsilanediols and more particularly to cyanoalkylsilanediols wherein the cyano group is interconnected to silicon through at least two carbon atoms.

My cyanoalkylsilanediols are represented by the formula:

$$[NCC_aH_{2a}]_n\overset{R_{2-n}}{\underset{|}{Si}}(OH)_2$$

where R is a monovalent hydrocarbon group, $a$ is an integer of 2 to 5 and $n$ is an integer of 1 to 2, and where each NC group is separated from the silicon atom by at least 2 carbon atoms of a $C_aH_{2a}$ group. Thus, cyanoalkylsilanediols included in this invention are gamma-cyanopropyl(phenyl)silanediol, bis(gamma-cyanopropyl)silanediol, beta-cyanoethyl(methyl)silanediol, bis(beta-cyanoethyl)silanediol, delta-cyanobutyl(ethyl)silanediol, bis(delta-cyanobutyl)silanediol, beta-cyanopropyl(ethyl)silanediol, bis(beta-cyanopropyl)silanediol, epsilon-cyanopentyl(vinyl)silanediol, bis(epsilon-cyanopentyl)silanediol, beta-cyanoethyl(phenyl)silanediol and the like.

The cyanoalkylsilanediols of this invention are distinctly different from alpha-cyanoalkylsilanediols containing cyano groups interconnected to silicon through only one carbon atom, e.g., cyanomethyl(phenyl)silanediol. Alpha-cyanoalkylsilanediols have been found to readily undergo silicon to carbon bond cleavage of the cyanoalkyl group in alkaline or even acid medium, whereas my cyanoalkylsilanediols are surprisingly stable to such cleavage. In addition, my cyanoalkylsilanediols are much more readily hydrogenated to form the aminoalkylsilanediol derivatives by conversion of the cyano groups thereof to aminomethylene, $H_2NCH_2$—, groups. These superior properties permit my cyanoalkylsilanediols to be used in a wide variety of important applications.

Siloxane oils which are useful as lubricants or additives to lubricants for improving lubricity can be made by condensing the cyanoalkylsilanediols of this invention or by co-condensing them with other silanediols, e.g., dimethylsilanediol in accordance with known procedures. My cyanoalkylsilanediols can be hydrogenated in the presence of a suitable catalyst, e.g., Raney nickel, (with or without ammonia) to form aminoalkylsilanediols of the formula:

$$[H_2NC_bH_{2b}]_n\overset{R_{2-n}}{\underset{|}{Si}}(OH)_2$$

where $b$ is an integer of 3 to 6 and R and $n$ are as previously defined. The aminoalkylsilanediols can also be prepared by an alternative method which involves the hydrolysis of aminoalkyldialkoxysilanes having the above formula containing, however, alkoxy groups in place of hydroxyl groups. Procedures employed in such a hydrolysis are within the knowledge of those skilled in the art. The aminoalkylsilanediols are useful in preparing siloxane oils by condensation in accordance with known methods, and such oils are also useful as lubricants or lubricity improving additives.

An advantageous method for making my cyanoalkylsilanediols is to add with stirring an ether solution of a cyanoalkyldichlorosilane of the formula:

$$[NCC_aH_{2a}]_n\overset{R_{2-n}}{\underset{|}{Si}}Cl_2$$

where R, $n$ and $a$ are as previously defined, to a mixture of crushed ice, diethyl ether and water. The cyanoalkyldichlorosilanes are known in the art. After the addition of the ether solution, the reaction mixture separates into two phases, one of which being the ether phase. The ether phase is forthwith removed and neutralized by washing with or without the addition of a neutralizing agent such as sodium bicarbonate. The reaction mixture should be kept cold until removal and neutralization of the ether phase. The neutralized ether layer is then dried as by adding a dessicant, e.g., anhydrous calcium sulfate, and concentrated under reduced pressure at a pot temperature of not more than 35° C. The product, cyanoalkylsilanediol is thus obtained as a residue.

Illustrative of a typical method for making my cyanoalkylsilanediols is the following method employing gamma-cyanopropyl(phenyl)dichlorosilane as starting material. Fifty grams of gamma-cyanopropyl(phenyl)dichlorosilane were dissolved in two hundred milliliters of anhydrous diethyl ether. The resulting solution was added over a period of two to three minutes to a mixture of one hundred and fifty milliliters of diethyl ether, three hundred cubic centimeters of crushed ice and one hundred cubic centimeters of water. The mixture was stirred continuously throughout the addition and for five additional minutes after the addition. The reaction mixture separated into an ether layer and a lower layer after stirring was stopped. The ether layer was removed, washed with water, then with a saturated aqueous sodium bicarbonate solution and then with water until neutral. The neutral ether layer was dried over anhydrous sodium sulfate and concentrated under reduced pressure while maintaining the temperature of the residue or efflux at or below about 25° C. After six hours of concentrating under reduced pressure, twenty three grams of a white, waxy solid representing gamma-cyanopropyl(phenyl)silanediol were obtained. Elemental analysis of the product provided the following data:

| | C | H | Si | N |
|---|---|---|---|---|
| Calculated for $C_{10}H_{13}SiNO_2$ | 58.0 | 6.27 | 13.5 | 6.87 |
| Found | 57.7 | 5.9 | 13.8 | 6.85 |

Employing similar procedures, bis(gamma-cyanopropyl)silanediol is obtained from bis(gamma-cyanopropyl)dichlorosilane; beta-cyanoethyl(methyl)silanediol is obtained from beta-cyanoethyl(methyl)dichlorosilane; bis(beta-cyanoethyl)silanediol is obtained from bis(beta-cyanoethyl)dichlorosilane; delta-cyanobutyl(ethyl)silanediol is obtained from delta-cyanobutyl(ethyl)dichlorosilane; bis(delta-cyanobutyl)silanediol is obtained from bis(delta-cyanobutyl)dichlorosilane; beta - cyanopropyl (ethyl)silanediol is obtained from beta-cyanopropyl (ethyl)dichlorosilane; bis(beta-cyanopropyl)silanediol is obtained from bis(beta-cyanopropyl)dichlorosilane; epsilon-cyanopentyl(vinyl)silanediol is obtained from epsilon-cyanopentyl(vinyl)dichlorosilane; and bis(epsilon-cyanopentyl)silanediol is obtained from bis(epsilon-cyanopentyl)dichlorosilane.

What is claimed is:
1. Cyanoalkylsilanediols of the formula:

$$[NCC_aH_{2a}]_n\overset{R_{2-n}}{\underset{|}{Si}}(OH)_2$$

where R is a monovalent hydrocarbon group, $a$ is an integer of 2 to 5 and $n$ is an integer of 1 to 2, and where each NC group is separated from the silicon atom by at least 2 carbon atoms of a $C_aH_{2a}$ group.
2. Gamma-cyanopropyl(phenyl)silanediol.
3. Beta-cyanoethyl(methyl)silanediol.

4. Bis(gamma-cyanopropyl)silanediol.
5. Bis(beta-cyanoethyl)silanediol.
6. Beta-cyanoethyl(phenyl)silanediol.

References Cited in the file of this patent

UNITED STATES PATENTS 2,744,923   Duane _____ May 8, 1956

FOREIGN PATENTS 1,116,725   France _____ Feb. 6, 1956
786,020    Great Britain _____ Nov. 6, 1957

OTHER REFERENCES

Speier et al.: "Jour. Amer. Chem. Soc.," vol. 79 (February 1957), pp. 974–9.